United States Patent Office  3,850,844
Patented Nov. 26, 1974

3,850,844
METHOD FOR THE PREPARATION OF A CARRIER USABLE FOR MANUFACTURING A CATALYST TO BE USED FOR CARRYING OUT A CATALYTIC REACTION OF HYDROCARBONS
Takeo Ao, Osaka, Japan, assignor to Osaka Yogyo Kabushiki Kaisha, Osaka Prefecture, Japan
No Drawing. Continuation-in-part of application Ser. No. 75,287, Sept. 24, 1970, which is a continuation-in-part of application Ser. No. 869,904, Oct. 27, 1969, both now abandoned. This application Dec. 22, 1972, Ser. No. 317,683
The term of this patent subsequent to Nov. 6, 1990, has been disclaimed
Int. Cl. C04b 35/10, 35/48, 35/56
U.S. Cl. 252—429 R          9 Claims

ABSTRACT OF THE DISCLOSURE

This invention relates to a method for the preparation of a catalyst carrier which comprises:
(I) pulverizing a member selected from the group consisting of $Al_2O_3$, SiC and $ZrO_2$ into particles which pass through a Tyler Standard sieve having a mesh of 65 to 325,
(II) mixing said particles with a binder which comprises:
  (A) 0.1 to 2.8% by weight of starch produced by pre-treating a starch-containing raw material such as potato or corn with an acid for 1 to 3 days at atmospheric pressure until the outer skin of the raw material is destroyed, heating the pre-treated raw material at 100° C. to 300° C. for 40 to 80 minutes to produce a lump of starch and then pulverizing the resultant lump of starch in the same manner as in the known techniques,
  (B) 0.05 to 2.5% by weight of a member selected from the group consisting of sodium carbonate, calcium chloride and magnesium sulfate, and
  (C) 0.05 to 2.5% by weight of a member selected from the group consisting of aluminum chloride, silicon chloride and zirconium chloride with the proviso that (1) the total weight of components A, B and C do not exceed 0.2 to 3% of the particles of step I and (2) that the ratio of $A/A+B+C$ is between 0.38 and 0.98, $B/A+B+C$ is between 0.017 and 0.945 and $C/A+B+C$ is between 0.017 and 0.945;
(III) molding said mixture into a predetermined shape, and
(IV) calcining the shaped mixture at about 600° C. to about 1350° C. for 1 to 5 hours to produce said carrier.

---

This application is a continuation-in-part application of Ser. No. 75,287, filed Sept. 24, 1970, which is a continuation-in-part application of Ser. No. 869,904, filed Oct. 27, 1969, and both now abandoned.

This invention relates to a method for the preparation of a carrier usable for manufacturing a Ni-oxide based catalyst which is to be used for the manufacture of various kinds of the chemical products by a catalytic reaction of hydrocarbons. In detail, this invention relates to a method for the preparation of a carier having a desired porosity, high durability and excellent efficiency by pulverizing a refractory selected from the group consisting of $Al_2O_3$, SiC and $ZrO_2$, into particles passing through a Tyler Standard sieve having a mesh of 65 to 325, said raw material having a purity of above 96%, mixing said particles with 0.2 to 3% by weight of a special admixture consisting of three components: A, B and C as defined hereinafter, molding the resultant mixture into a certain spherical shape or other desired shape, drying said shaped product, and calcining said shaped product at a relatively low temperature.

In general, when a carrier is made of a material which is to be used for obtaining a wide variety of particularly useful products by catalytic cracking reaction of hydrocarbons, it is usually necessary to add an inorganic sinterizer or a bonding material such as clay, $MnO_2$, $V_2O_5$, CaO or the like to the refractory material because the refractory material can hardly be sintered at low temperatures. In such a case, the carrier suffers unavoidably from some defects as listed below by containing such an inorganic sinterizer.

(1) When the inorganic low melting material is admixed in the conventional carriers, the thermostability of the carriers themselves is decreased.

(2) When a catalytically active component immersed in or coated on the carrier is reacted with an inorganic sinterizer such as clay, $MnO_2$, $V_2O_5$, CaO or the like contained in the carrier, the catalyst is greatly decreased in its catalytic activity.

(3) The active material of the carrier is reacted with the inorganic sinterzer having the low melting point to form a glassy phase on the surface of the carrier and as the result, the glassy phase causes minimization of the surface area of the carrier and also the ability of the carrier to support the catalytically active component which is reduced when such a carrier is calcined.

(4) The inorganic sinterizer tends to concentrate on the surface of the carrier and as the result, density is increased at the surface of the carrier and the porosity is relatively increased at the central part of the carrier, and therefore it becomes unsatisfactory in its mechanical property. On the contrary, this invention does not use the inorganic sinterizer such as clay, $MnO_2$, $V_2O_5$, CaO and the like which produce the low melting products during the formationof carrier, but this invention uses a refractory material having high purity for molding a shaped product and calcining the shaped product to produce a carrier and so the carrier can be freed of the defects as mentioned above. In accordance with this invention, a special admixture as defined hereinafter is used in an amount of 0.2 to 3% by weight. By using the special binder, the inventor has found that the carrier is remarkably increased in its strength in the dry state and can easily be handled and also that it is possible to produce a carrier having high sphericity, excellent quality and homogeneity.

The special binder consists of three components, A, B and C. The component A is starch produced by pretreating a starch-containing raw material such as potato or corn with an 0.1 normal solution of an organic acid, e.g. a carboxylic acid such as acetic acid, lactic acid or citric acid or an 0.01 normal solution of an inorganic acid, e.g. hydrochloric, nitric or sulfuric for 1 to 3 days at atmospheric pressure until the outer skin of the raw material is destroyed, heating the pre-treated raw material at a temperature of 100° C. to 300° C. for 40 to 80 minutes to produce a lump of starch, and then pulverizing the resultant lump of starch in the same manner as in the known techniques. The resultant potato starch or corn starch contains 0.5% of inorganic impurities and it has purity of 99.95%.

Thus, the component A imparts a plasticity satisfactory for the raw material such as $Al_2O_3$ and also prevents the cracking of the carrier when it is dried at a temperature of about 60° C. to about 120° C. The component B is a material selected from the group consisting of sodium carbonate, calcium chloride and magnesium sulfate.

Such a component B gives plasticity to the refractories such as $Al_2O_3$ and acts to prevent cracks on the carrier when calcined at a temperature of about 800° C. to 1,200° C. Component C is a material selected from chlorides of the raw materials employed. Component C is interacted with the refractory material on the basis of reciprocal principle as in the case of cement chemistry. Further, it should be noted that 99% of the component A is substantially vaporized at a temperature of about 1,000° C. and also that the components B and C act to accelerate the sintering of the raw materials such as $Al_2O_3$, SiC and $ZrO_2$.

The special admixture can be added in a total amount of 0.2 to 3% by weight of the raw material and two or more elements of component B or of component C may be used for the preparation of the special admixture.

The carrier produced in accordance with this invention employs raw materials having a purity of about 96% and it does not contain low melting materials such as clay or feldspar. The carrier can be molded into desired shapes such as spheres or granules having a predetermined diameter and it possesses a well controlled porosity and compressive strength depending on the shape of the carrier. When the carrier is molded into a sphere, it may be homogeneously uniform between the center and the surface of the carrier or it may be porous on the outer surface of the carrier and dense in the center part of the carrier or it may be shaped with the center as a void. The purity of the refractory material should be more than 96% pure here, and if the purity is less than 96%, the resultant carrier is lower in thermostability and durability because of the presence of other impurities and the fused material tends to adhere to the surface of the carrier during operation.

The particle size of the raw material to be used for the preparation of the carrier is defined as capable of passing through a Tyler Stanard sieve having a mesh of 65 to 325, and if the particle size of the non-plastic material is greater than 65 mesh, the calcining is insufficient. Also, it is preferable to add the special admixture in the total amount of 0.2 to 3% by weight into the non-plastic material, because if the special admixture is used in an amount of below 0.2% by weight, it cannot display its advantageous function and effect as explained above, and also if the special admixture is used in the total amount of above 3% by weight, it produces a high porosity carrier.

The following Table I indicates the difference between examples and comparative examples to illustrate the quality of the carriers which are prepared by using the special admixture of this invention in comparison with the carriers which are prepared not using the special admixture of this invention.

The spent pulp liquor used in the following comparative examples was analyzed as follows:

Specific gravity _____ 1.007 at 15° C.
Total sulfur _____ 12.6 g./l.
Total sulfurous acid ($H_2SO_3$) _____ 6.1 g./l.
Total sulfuric acid ($M_2SO_4$) _____ 2.4 g./l.
Total ashes _____ 24.5 g./l.
Total calcium (calculated as CaO) ____ 7.3 g./l.
Total sugar _____ 31.2 g./l.
Total ligninsulfonic acid _____ 95.5 g./l.

A preferred working example for manufacturing the component A (or the starch) is illustrated as follows.

The starch was produced by pre-treating potato with a 0.1 normal (0.1 N) solution of lactic acid for 2 days at atmospheric pressure for destroying the outer skin of the potato, heating the pre-treated potato in a rotary kiln at 150° C. for one hour to produce a lump of starch and then pulverizing the resultant lump of starch in the same manner as in the known techniques.

| Materials | Example 1 | Comparative example 1 | Example 2 | Comparative example 2 | Example 3 | Comparative example 3 |
|---|---|---|---|---|---|---|
| Alumina passed through 65 meshes (wt. percent) | 100 | 100 | | | | |
| Zircon passed through 65 meshes (wt. percent) | | | 100 | 100 | | |
| Silicon carbide passed through 65 meshes (wt. percent) | | | | | 100 | 100 |
| Special admixture (wt. percent) (A+B+C) | 1.0 | | 1.0 | | 0.5 | |
| Component A (wt. percent) | 0.5 | | 0.4 | | 0.2 | |
| Component B (wt. percent) | 0.3 ($Na_2CO_3$) | | 0.3 ($CaCl_2$) | | 0.15 ($MgSO_4$) | |
| Component C (wt. percent) | 0.2 ($AlCl_3$) | | 0.3 ($ZnCl_2$) | | 0.15 ($SiCl_4$) | |
| Spent liquor from the pulpmaking (wt. percent) | | 1 | | 1 | | 1 |
| Molding | Using an oil press at 500 kg./cm.² | | | | Using a friction type press. | |
| Drying | 100° C., 13 hours. | | | | 110° C., 4 hours. | |
| Calcining (gas oven) | SK 26, one hour. | | | | SK 18, 3 hours. | |
| Carrier is tested for: | | | | | | |
| Prosity (percent) | 44.5 | 46.7 | 31.2 | 31.7 | 15.8 | 17.2 |
| Apparent sp. gravity | 4.00 | 3.94 | 4.43 | 4.42 | 3.06 | 3.08 |
| Bulk sp. gravity | 2.22 | 2.10 | 3.05 | 3.02 | 2.58 | 2.55 |
| Compressive strength (kg./cm.², dried body before calcined) | 175 | 56 | 370 | 60 | 116 | 60 |
| Compressive strength (kg./cm.², calcined) | 1,037 | 397 | 2,160 | 1,025 | 1,310 | 1,188 |
| $Al_2O_3$ (percent) | 96 | 96 | | | | |
| $ZrO_2 \cdot SiO_2$ (percent) | | | 98 | 98 | | |
| SiC (percent) | | | | | 96 | 96 |

The proportions of components A, B and C are of extreme importance. Thus, not only must the combined weight of A, B and C be between 0.2 and 3% by weight of the refractory, e.g., $Al_2O_3$ but also the ratio of $A/(A+B+C)$ must be between 0.038 and 0.93, $B/(A+B+C)$ must be between 0.017 and 0.945.

Thus, when component A is used in an amount of below 0.1%, a satisfactory result cannot be obtained and when it is used in an amount of above 2.8%, the porosity of the carrier is undesirably increased and when the components B and C are used in an amount of below 0.05%, a satisfactory result cannot be obtained in each case and when they are used in an amount of above 2.5%, the thermostability and durability of the carrier (or the catalyst) are undesirably decreased.

That Examples 1, 2 and 3 comply with these requirements is evident from Table 1A.

TABLE 1A

| | $A/(A+B+C)$ | $B/(A+B+C)$ | $C/(A+B+C)$ |
|---|---|---|---|
| Example: | | | |
| 1 | 0.5 | 0.3 | 0.2 |
| 2 | 0.4 | 0.3 | 0.3 |
| 3 | 0.4 | 0.3 | 0.3 |

It is obvious from the above tables that Examples 1, 2 and 3 using the special admixture of this invention demonstrate the advantageous effects of said admixture for improving the compressive strength of the uncalcined raw carrier and the calcined carrier in comparison with the comparative Examples 1, 2 and 3 using as component B a clay-like material or a feldspatic material and spent liquor produced in the pulp making. Also, it is found that the carrier of this invention as shown in Example 1, 2 or 3 has the good thermal resistance as an essential feature.

Now, the industrial and technical effects achieved by this invention are listed as follows:

(1) The carrier has high purity and high thermal resistance as compared with the conventional carrier, and therefore the carriers are not adhered to each other when they are used at high temperatures and therefore the carrier can be used for a long time.

(2) The carrier does not react with a catalytic component because said carrier has high purity and therefore a catalyst having high activity can be obtained by using the carrier and the catalyst has a long life for maintaining its activity.

(3) A catalyst having high activity and a greater surface area can be produced by using the carrier because the surface of said carrier is porous and microscopically uneven for holding a catalytic component firmly.

(4) The carrier produced with high purity can be sufficiently calcined at low temperatures and so the carrier itself has good activity and it can be economically produced with ease.

(5) A constant catalytic reaction can be steadily carried out because the carrier can be produced in a uniform granular or spherical body having the homogeneity, controlled size and quality depending on the characteristics of the carrier.

The Examples 4, 5 and 6 for illustrating this invention are shown as follows. It is noted that the shaped mixture can be calcined at a temperature of about 600° C. to about 1350° C. for 1 to 5 hours to produce a carrier.

EXAMPLE 4

A mixture of 97.2 parts by weight of alumina passed through the Tyler Standard 325-mesh, one part by weight of component A, 0.8 parts by weight of the component B ($Na_2CO_3$) and one part by weight of the component C ($AlCl_3$) was molded into a granular body by using a tablet-making machine and then the granular body was dried at 110° C. for 4 hours and then the dried granular body was calcined in an electric furnace at 700° C. for one hour to produce a carrier. It was found that the carrier has porosity of 52.1%, apparent sp. gravity of 2.82, bulk sp. gravity of 1.35, compressive strength of 120 kg./cm.$^2$ and an alumina ($Al_2O_3$) content of 97.8%.

EXAMPLE 5

A mixture of 99.3 parts by weight of silicon carbide passed through the Tyler Standard 250-mesh and 0.7 parts by weight of admixture (component A—0.3 parts, component B—$MgSO_4$—0.2 parts and component C—$SiCl_4$—0.2 parts) was molded into pellets by using a pelletizing machine and then the pellets were dried at 110° C. for 3 hours and then the dried pellets were calcined at 1,350° C. for 3 hours to produce a carrier. It was found that the carrier has a porosity of 20.3%, apparent sp. gravity of 3.01, bulk sp. density of 2.40, compressive strength of 940 kg./cm.$^2$ and an SiC content of 96.4%.

EXAMPLE 6

A mixture of 99.5 parts by weight of zircon sand passed through the Tyler Standard 65-mesh, 0.5 parts of the special admixture (0.2 parts component A, 0.15 parts component B—$CaCl_2$ and 0.15 parts component C—$ZrCl_3$) was molded into pellets by using a pelletizing pan and then the pellets were dried at 110° C. for 3 hours and then the dried pellets were calcined at 1,350° C. for 3 hours to produce a carrier. It was found that the carrier has a porosity of 32.0%, apparent sp. gravity of 4.47, bulk sp. gravity of 3.04, compressive strength of 840 kg./cm.$^2$ and an $ZrO_2 \cdot SiO_2$ content of 98.1%.

TABLE 2

| Materials | Example 7 | 8 | 9 | 10 | 11 | 12 |
|---|---|---|---|---|---|---|
| Alumina passed through 65 mesh (wt. percent) | 100 | 100 | | | | |
| Zirconium dioxide passed through 65 mesh (wt. percent) | | | 100 | 100 | | |
| Silicon carbide passed through 65 mesh (wt. percent) | | | | | 100 | 100 |
| Special mixture: | | | | | | |
| A | 0.1 | 2.8 | 0.45 | 0.1 | 0.45 | 0.1 |
| B | $Na_2CO_3$ 2.5 | $Na_2CO_3$ 0.1 | $CaCl_2$ 0.05 | $CaCl_2$ 2.5 | $MgSO_4$ 2.5 | $MgSO_4$ 0.05 |
| C | $AlCl_3$ 0.05 | $AlCl_3$ 0.1 | $ZrCl_4$ 2.5 | $ZrCl_4$ 0.05 | $SiCl_4$ 0.05 | $SiCl_4$ 2.5 |
| Molding | Using an oil press at 500 kg./cm. | | | | Using a fraction type press. | |
| Drying | 100° C., 13 hours | | | | 110° C., 4 hours. | |
| Calcining (gas oven) | SK 26, one hour. | | | | SK 18, 3 hours. | |
| Porosity (percent) | 35.6 | 45.7 | 31.5 | 28.4 | 13.3 | 16.4 |
| Apparent sp. gravity | 3.92 | 4.02 | 4.43 | 4.40 | 4.04 | 3.07 |
| Bulk sp. gravity | 2.52 | 2.18 | 3.04 | 3.15 | 2.64 | 2.57 |
| Compressive strength (kg./cm.$^2$) (dried body before calcined) | 85 | 275 | 380 | 105 | 204 | 95 |
| Compressive strength (kg./cm.$^2$) calcined | 1,830 | 540 | 1,760 | 2,470 | 1,520 | 1,27 |

TABLE 2A

| Materials | Example 7 | 8 | 9 | 10 | 11 | 12 |
|---|---|---|---|---|---|---|
| $Al_2O_3$ (%) | 95 | 96 | | | | |
| $ZrO_2$ (%) | | | 98 | 96 | | |
| SiO (%) | | | | | 94 | 94 |
| $A/(A+B+C)$ | 0.038 | 0.93 | | | | |
| $B/(A+B+C)$ | | | 0.017 | 0.945 | | |
| $C/(A+B+C)$ | | | | | 0.017 | 0.945 |

As is evident from the above Table 2 in accordance with this invention, the ratio of $A/(A+B+C)$ is varied from 0.038 (minimum) to 0.93 (maximum), the ratio of $B/(A+B+C)$ is varied from 0.017 (minimum) to 0.945 (maximum) and the ratio of $C/(A+B+C)$ is varied from 0.017 (minimum) to 0.945 (maximum). These ratios are shown in the following Table 3.

TABLE 3

| | | | | (A+B+C) | A/(A+B+C) | | B/(A+B+C) | | C/(A+B+C) | |
|---|---|---|---|---|---|---|---|---|---|---|
| | A | B | C | | Min. | Max. | Min. | Max. | Min. | Max. |
| Example: | | | | | | | | | | |
| 7 | 0.1 | 2.5 | 0.05 | 2.65 | 0.038 | | | | | |
| 8 | 2.8 | 0.1 | 0.1 | 3.0 | | 0.93 | | | | |
| 9 | 0.45 | 0.05 | 2.5 | 3.0 | | | 0.017 | | | |
| 10 | 0.1 | 2.5 | 0.05 | 2.65 | | | | 0.945 | | |
| 11 | 0.45 | 2.5 | 0.05 | 3.0 | | | | | 0.017 | |
| 12 | 0.1 | 0.05 | 2.5 | 2.65 | | | | | | |

The reasons why the upper and the lower limits of the ratios of $A/(A+B+C)$, $B/(A+B+C)$ and $C/(A+B+C)$ must be defined by the above-indicated values are clarified as follows:

(i) The upper limit of $A/(A+B+C)$ is defined as 0.93 by using the component $A=2.8$, the component $B=0.1$ and the component $C=0.1$. When the component A is used in an amount of above 2.8% by weight, the resultant carrier (or catalyst) is excessively increased in its porosity and reduced in its strength. When the components B and C are used in an amount of below 0.1% by weight, they cannot display their effective actions and results.

The lower limit of $A/(A+B+C)$ is defined as 0.038 by using the component $A=0.1$, the component $B=2.5$ and the component $C=0.05$. When the component A is used in an amount of below 0.1% by weight, it cannot display its effective actions and results. When the component B is used in an amount of above 2.5% by weight, the resultant carrier (or catalyst) is reduced in its thermostability. Similarly, when the component C is used in an amount of above 0.05% by weight the resultant carrier (or catalyst) is reduced in its thermostability.

(ii) The upper limit of $B/(A+B+C)$ is defined as 0.945 by using the component $A=0.1$, the component $B=2.5$ and the component $C=0.05$. When the component A is used in an amount of below 0.1% by weight, it cannot display its effective actions and results. When the component B is above 2.5% by weight, the resultant carrier (or catalyst) is excessively reduced in its thermostability. When the component C is below 0.05% by weight it cannot display its effective actions and results. Similarly, the lower limit of $B/(A+B+C)$ is defined to 0.017 when the upper limit of the special admixture $(A+B+C)$ is 3.0% by weight and the component B is used in the amount of the lower limit of 0.05% by weight.

(iii) The upper limit of $C/(A+B+C)$ is defined as 0.945 by using the component $A=0.1$, the component $B=0.05$ and the component $C=2.5$. When the component A is used in an amount below 0.1% by weight and the component B is used in an amount below 0.05% by weight, they cannot display their effective actions and results. When the component C is used in an amount of above 2.5% by weight, the resultant carrier (or catalyst) is excessively reduced in its thermostability.

Similarly, the lower limit of $C/(A+B+C)$ is defined as 0.017 when the upper limit of the special admixture $(A+B+C)$ is 3.0% by weight, the component B is used in an amount of the upper limit of 2.5% by weight and the component C is used in an amount of the lower limit of 0.05% by weight. In this case, the resultant carrier (or catalyst) is excessively reduced when the component B is used in an amount of above 2.5% by weight and the component C cannot display its effective actions and results when it is used in an amount of below 0.05% by weight. The component A is used in an amount of 0.45% by weight which is calculated on 0.3% of the upper limit of the special admixture, $(A+B+C)$ by the formula, $3.0-2.5-0.05=0.45$.

What is claimed is:

1. A method for the preparation of a catalyst carrier which comprises:
   (I) pulverizing a member selected from the group consisting of $Al_2O_3$, SiC and $ZrO_2$ into particles which pass through a Tyler Standard sieve having a mesh of 65 to 325,
   (II) mixing said particles with a binder which comprises:
      (A) 0.1 to 2.8% by weight of starch produced by pre-treating a starch-containing raw material with an organic or inorganic acid for 1 to 3 days at atmospheric pressure until the outer skin of the raw material is destroyed, heating the pre-treated raw material at a temperature of 100 to 300° C. for 40 to 80 minutes to produce a lump of starch and then pulverizing the resultant lump of starch,
      (B) 0.05 to 2.5% by weight of a member selected from the group consisting of sodium carbonate, calcium chloride and magnesium sulfate, and
      (C) 0.05 to 2.5% by weight of a member selected from the group consisting of aluminum chloride, silicon chloride and zirconium chloride with the proviso that (1) the total weight of components A, B and C do not exceed 0.2 to 3% of the particles of step I, and (2) that the ratio of $A/A+B+C$ is between 0.38 and 0.98, $B/A+B+C$ is between 0.017 and 0.945 and $C/A+B+C$ is between 0.017 and 0.945;
   (III) molding said mixture into a predetermined shape, and
   (IV) calcining the shaped mixture at about 600° C. to about 1350° C. for 1 to 5 hours to produce said carrier.

2. A process according to claim 1, wherein the starch for component A is selected from the group consisting of potato starch and corn starch.

3. A process according to claim 1, wherein the acid used to treat the starch is an inorganic acid selected from the group consisting of hydrochloric, nitric and sulfuric acids, or an organic acid selected from the group consisting of acetic, lactic and citric acids.

4. A process according to claim 1 wherein the material of I is $Al_2O_3$.

5. A process according to claim 4 wherein the pulverized $Al_2O_3$ is calcined with $Na_2CO_3$ as component B and $AlCl_3$ as component C.

6. A process according to claim 1, wherein pulverized $ZrO_2$ is calcined with $CaCl_2$ as component B and $ZrCl_4$ as component C.

7. A process according to claim 1, wherein pulverized SiC is calcined with $MgSO_4$ as component B and $SiCl_4$ as component C.

8. A process according to claim 1, wherein the particles are molded in step (III) into a substantially spherical shape.

9. The catalyst carrier produced by the process of claim 1.

(References on following page)

References Cited

UNITED STATES PATENTS

| | | | |
|---|---|---|---|
| 2,409,494 | 10/1946 | Keatling | 252—430 |
| 2,929,792 | 3/1960 | Arnold et al. | 252—430 |
| 3,387,038 | 6/1968 | Koch | 252—437 X |
| 3,567,811 | 3/1971 | Humphrey | 264—63 |
| 3,709,832 | 1/1973 | Ao | 252—429 R |

PATRICK P. GARVIN, Primary Examiner

A. H. METZ, Assistant Examiner

U.S. Cl. X.R.

264—63